United States Patent Office 2,797,248
Patented June 25, 1957

2,797,248

DICHLOROMETHYLENE-CYCLOHEXYL COMPOUNDS

Donald G. Kundiger, Manhattan, Kans., and Huey Pledger, Jr., Midland, Mich., assignors to The Dow Chemical Company, Midland, Mich., a corporation of Delaware No Drawing. Application May 28, 1956,
Serial No. 587,475

4 Claims. (Cl. 260—619)

This invention is concerned with dichloromethylene-cyclohexyl compounds and with methods for the preparation thereof.

The new compounds are oily liquids or crystalline solids somewhat soluble in many organic solvents and substantially insoluble in water. They have been found useful as chemical intermediates and active insecticidal toxicants for the control of insect pests such as aphids, mites, flies and cockroaches.

The compounds of the invention may be represented by the formula

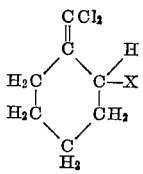

wherein X represents chlorine or a hydroxyphenyl radical. The expression "hydroxyphenyl" as herein employed refers to hydroxyphenyl radicals which may be unsubstituted or substituted with one or more neutral substituents such as lower-alkyl and lower-alkoxy radicals or chlorine. The expressions "lower-alkyl" and "lower-alkoxy" as employed herein refer to such radicals containing from 1 to 4 carbon atoms, inclusive.

The method employed for the preparation of the compounds varies depending upon the particular product desired. Thus, 2-dichloromethylene-cyclohexyl chloride may be prepared by reacting 1-trichloromethyl-1-cyclohexanol with a molar excess of thionyl chloride. The resulting 2-dichloromethylene-cyclohexyl chloride product may then be heated with phenol or a substituted phenol to produce a 2-(2-dichloromethylene-cyclohexyl)phenol product.

In a preferred method for the preparation of the 2-dichloromethylene-cyclohexyl chloride product, 1 molar proportion of 1-trichloromethyl-1-cyclohexanol is reacted with at least 2 molar proportions of thionyl chloride at a temperature of from about 25° to about 75° C. The reaction is initiated readily when the reactants are contacted at a reaction temperature as set forth above and proceeds with the evolution of hydrogen chloride and sulfur dioxide. The reaction is somewhat exothermic and the rate thereof may be controlled by the amount of external heating supplied and by the rate of admixture of the reactants. On completion of the reaction, unreacted excess thionyl chloride may be recovered by distillation and the desired 2-dichloromethylene-cyclohexyl chloride product separated by fractional distillation under reduced pressure.

In the preparation of the (2-dichloromethylene-cyclohexyl)phenol compounds, 1 molar proportion of 2-dichloromethylene-cyclohexyl chloride is mixed with at least 1 molar proportion of a phenol or substituted phenol and the mixture heated at temperatures of from about 50° to 100° C. The reaction is exothermic and proceeds readily with the evolution of hydrogen chloride of reaction. On completion of the reaction, as evidenced by a marked drop in the rate of evolution of hydrogen chloride, unreacted starting material and the desired (2-dichloromethylene-cyclohexyl)phenol product are separated by fractional distillation under reduced pressure. Where the products of the latter reaction are crystalline, they may be further purified by recrystallization from suitable organic solvents such as liquid hydrocarbons, halohydrocarbons and the like.

In a representative preparation of 2-dichloromethylene-cyclohexyl chloride, 610 milliliters (8.4 moles) of thionyl chloride was added portionwise with stirring to 374 grams (1.72 moles) of 1-trichloromethyl-1-cyclohexanol at room temperature. During the addition of the initial 100 milliliters of thionyl chloride, vigorous evolution of hydrogen chloride and sulfur dioxide was observed. On completion of the addition of all the thionyl chloride, the mixture was maintained at room temperature for about 19 hours and then heated at gradually increasing temperatures up to about 65° C. where it was maintained for a period of 5 hours. On completion of the reaction, as evidenced by the marked slackening in evolution of acid gases from the reaction mixture, the crude product was fractionally distilled to recover unreacted thionyl chloride and to separate the desired 2-dichloromethylene-cyclohexyl chloride product as an oily liquid boiling at 110°–126° C. under 28 millimeters pressure and characterized by a refractive index, n/D, of 1.531 at 20° C. and a density (20°/4° C.) of 1.314.

In a further representative operation, 108.1 grams (1 mole) of p-cresol and 99.6 grams (0.5 mole) of 2-dichloromethylene-cyclohexyl chloride were mixed together and heated at temperatures of from 63° to 71° C. for a period of 21 minutes. During the above heating, hydrogen chloride gas was evolved rapidly from the reaction mixture. On completion of the reaction, the crude product was fractionally distilled under reduced pressure to recover unreacted starting materials and to separate a crude 2-(2-dichloromethylene-cyclohexyl)-4-methylphenol product as a viscous liquid having a boiling range of from 142° to 162° C. under about 3 millimeters pressure. On standing, this product formed a sticky crystalline mass. The latter was recrystallized from petroleum ether to obtain a purified 2-(2-dichloromethylene-cyclohexyl)-4-methylphenol product as a crystalline solid melting at 81°–82° C. Infrared absorption data for this product confirmed the assigned structure.

In a similar fashion, one molar proportion of 2-dichloromethylene-cyclohexyl chloride is heated with at least one molar proportion of phenol to produce 2-(2-dichloromethylene-cyclohexyl)phenol and 4-(2-dichloromethylene-cyclohexyl)phenol. In like manner, 2-dichloromethylene-cyclohexyl chloride is heated with 4-chlorophenol, 4-bromophenol, 4-tertiary-butylphenol, 4-isopropylphenol and 2,4-dimethylphenol to produce 2-(2-dichloromethylene-cyclohexyl)-4-chlorophenol, 2-(2-dichloromethylene-cyclohexyl)-4-bromophenol, 2-(2-dichloromethylene-cyclohexyl)-4-tertiarybutylphenol, 2-(2-dichloromethylene-cyclohexyl)-4-isopropylphenol and 2-(2-dichloromethylene-cyclohexyl)-4,6-dimethylphenol, respectively.

In representative determinations, 2-dichloromethylene-cyclohexyl chloride and 2-(2-dichloromethylene-cyclohexyl)-4-methylphenol were separately dispersed in water to prepare aqueous compositions containing 2 pounds of one of the dichloromethylene-cyclohexyl compounds per 100 gallons of composition. These compositions were applied to thoroughly wet two-spotted mites on bean plants, bean aphids on nasturtium plants and caged house flies. 95 to 100 percent kills of the mite and insect organisms were obtained with each of the compositions.

We claim:
1. Dichloromethylene - cyclohexyl compounds having the formula

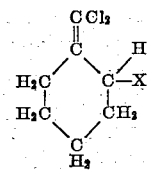

wherein X is selected from the group consisting of chlorine and hydroxylphenyl radicals.

2. A method for the preparation of (2-dichloromethylene-cyclohexyl)phenols which comprises heating a mixture of a phenol and 2-dichloromethylene-cyclohexyl chloride at a temperature of from about 50° to 100° C.

3. 2-dichloromethylene-cyclohexyl chloride.

4. 2-(2-dichloromethylene-cyclohexyl)-4-methylphenol.

No references cited.